(12) United States Patent
Kato et al.

(10) Patent No.: US 6,788,503 B2
(45) Date of Patent: Sep. 7, 2004

(54) PROTECTING CIRCUIT AGAINST SHORT-CIRCUIT OF OUTPUT TERMINAL OF AC ADAPTER

(75) Inventors: Hiromi Kato, Atsugi (JP); Yuji Yamanaka, Atsugi (JP)

(73) Assignee: Mitsumi Electric Co., Ltd., Chofu (JP)

( * ) Notice: Subject to any disclaimer, the term of this patent is extended or adjusted under 35 U.S.C. 154(b) by 67 days.

(21) Appl. No.: 10/067,059

(22) Filed: Feb. 4, 2002

(65) Prior Publication Data

US 2002/0167770 A1 Nov. 14, 2002

(30) Foreign Application Priority Data

Feb. 9, 2001 (JP) ........................................ 2001-033573

(51) Int. Cl.[7] .............................................. H02H 7/00
(52) U.S. Cl. ........................................ 361/18; 361/93.9
(58) Field of Search ............................ 361/180, 93.9; 323/276, 281, 280, 277

(56) References Cited

U.S. PATENT DOCUMENTS

RE33,941 E * 5/1992 Lorincz et al. ............... 361/87
5,859,757 A * 1/1999 Hanafusa et al. ........... 361/100
6,452,766 B1 * 9/2002 Carper ........................ 361/18

* cited by examiner

*Primary Examiner*—Shawn Riley
(74) *Attorney, Agent, or Firm*—Frishauf, Holtz, Goodman & Chick, P.C.

(57) ABSTRACT

A protecting circuit against short-circuit of an output terminal of an AC adapter, includes a current output switching transistor in which a power source is connected to an emitter thereof and an output terminal is connected to a collector thereof, a first switching transistor which is turned on when a controlled constant-voltage is over an available range of a voltage difference between a voltage of said power source and an output voltage, a second switching transistor which is connected to be turned on when the first switching transistor is turned on, a switch control amplifier which controls a switching operation so that the current output switching transistor is turned off when a voltage of the power source is a predetermined voltage or less, and a constant-current control amplifier which controls a constant current when the second switching transistor is turned on and enters a protecting operation state.

3 Claims, 2 Drawing Sheets

PROTECTING CIRCUIT AGAINST SHORT-CIRCUIT OF OUTPUT TERMINAL OF AC ADAPTER

BACKGROUND OF THE INVENTION

The present invention relates to a protecting circuit which can control an output current, against short-circuit of an output terminal of an AC adapter.

In conventional AC adapters for charge, an output voltage thereof is temporarily zero, when a large current flows or an output terminal of an AC adapter is short-circuited. Thereafter, the conventional AC adapters for charge can be charged again by flowing a load current of approximately 500 mA. To prevent heating due to the charge, means for preventing the heating is provided for a casing of the AC adapters.

However, as mentioned above, the output voltage is temporarily zero and the load current of approximately 500 mA thereafter flows to charge the AC adapter again, when the output terminal of the AC adapter is short-circuited and, then, there is a danger in that the output terminal of the AC adapter is repeatedly short-circuited. In this case, since the means for preventing the heating has limitation, there is a danger in that the load is damaged.

SUMMARY OF THE INVENTION

Accordingly, it is an object of the present invention to provide a preventing circuit against short-circuit of an output terminal of an AC adapter, which needs no means for preventing the heating by controlling an output current.

The present invention is devised by paying attention to a fact that a value of a controlled constant-voltage is reduced to make the above means for preventing the heating unnecessary, only when it is within an available range.

A protecting circuit in the present invention comprises a current output switching transistor, a first switching transistor, a second switching transistor, a switch control amplifier, and a constant-current control amplifier.

A power source is connected to an emitter of the current output switching transistor, and an output terminal is connected to a collector of the current output switching transistor. The first switching transistor is turned on when a value of a controlled constant-voltage is approximately a value when a voltage difference between a voltage of the power source and an output voltage is over an available range. The second switching transistor is connected to be turned on when the first switching transistor is turned on. The switch control amplifier which controls a switching operation so that the current output switching transistor is turned off when a voltage of the power source is a predetermined voltage or less. The constant-current control amplifier controls a constant current when the second switching transistor is turned on and enters a protecting operation state.

DESCRIPTION OF THE PREFERRED EMBODIMENTS

Figure 1:
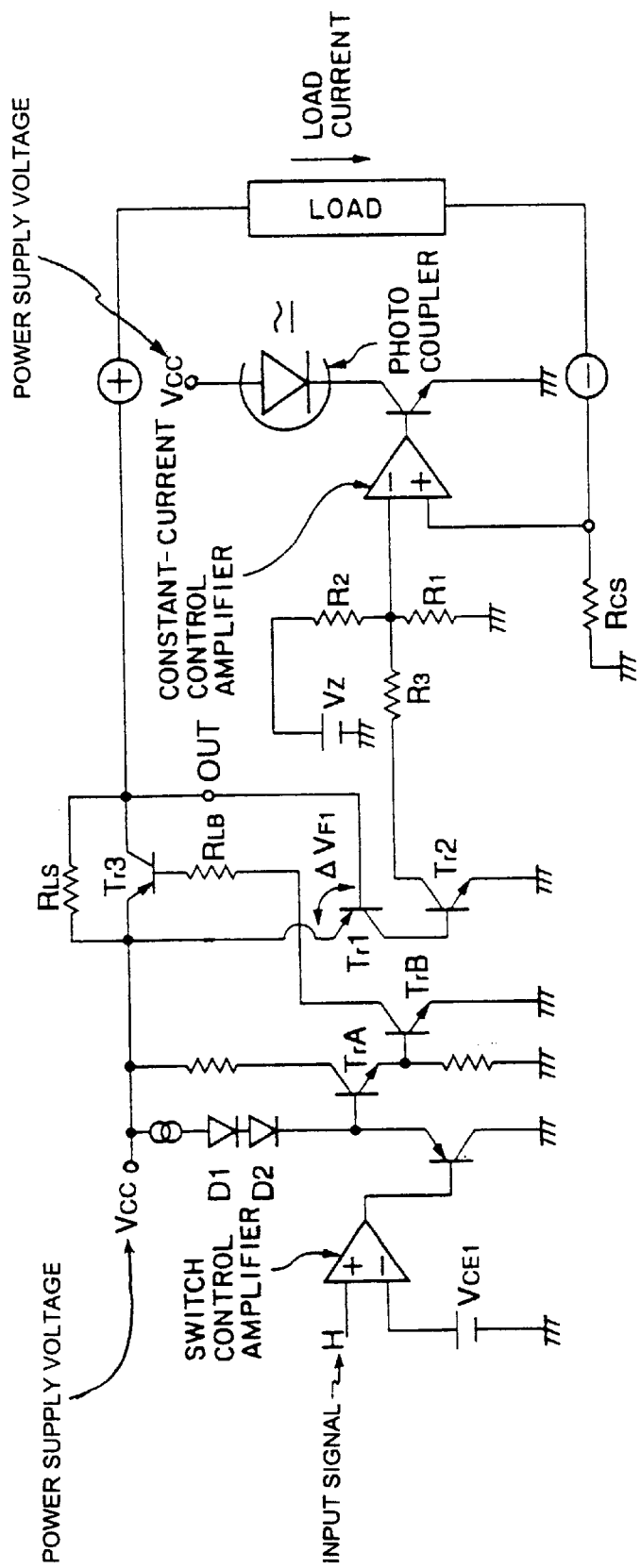
FIG. 1 is a diagram showing the structure of a protecting circuit when an output terminal of an AC adapter is short-circuited in the present invention.

Hereinbelow, a description is given of a protecting circuit according to an embodiment of the present invention when an output terminal of an AC adapter is short-circuited. FIG. 1 is a circuit diagram showing the structure of the protecting circuit when the output terminal of the AC adapter is short-circuited. Referring to FIG. 1, the protecting circuit when the output terminal of the AC adapter is short-circuited in the present invention, comprises a current output switching transistor $Tr_3$, a switch control amplifier, a switching transistor $Tr_1$ a switching transistor $Tr_2$, and a constant-current control amplifier.

The switch control amplifier controls an on/off operation of the current output switching transistor $Tr_3$. A load detecting resistor $R_{Ls}$ is connected between an emitter and a collector of the current output switching transistor $Tr_3$. A load detecting resistor $R_{LB}$ is connected to a base of the current output switching transistor $Tr_3$. A power source $V_{cc}$ is connected to the emitter of the current output switching transistor $Tr_3$, and an output terminal OUT is connected to the collector of the current output switching transistor $Tr_3$.

The power source $V_{cc}$ is connected to an emitter of the switching transistor $Tr_1$. The output terminal OUT is connected to a base of the switching transistor $Tr_1$. A collector of the switching transistor $Tr_1$ is connected to a base of the switching transistor $Tr_2$.

Resistors $R_1$, $R_2$, and $R_3$ are connected to a negative input terminal (−) of the constant-current control amplifier. A reference voltage source Vz is connected to one end of the resistor $R_2$. A current detecting resistor $R_{cs}$ is connected to a positive input terminal of the constant-current control amplifier.

Figure 2:
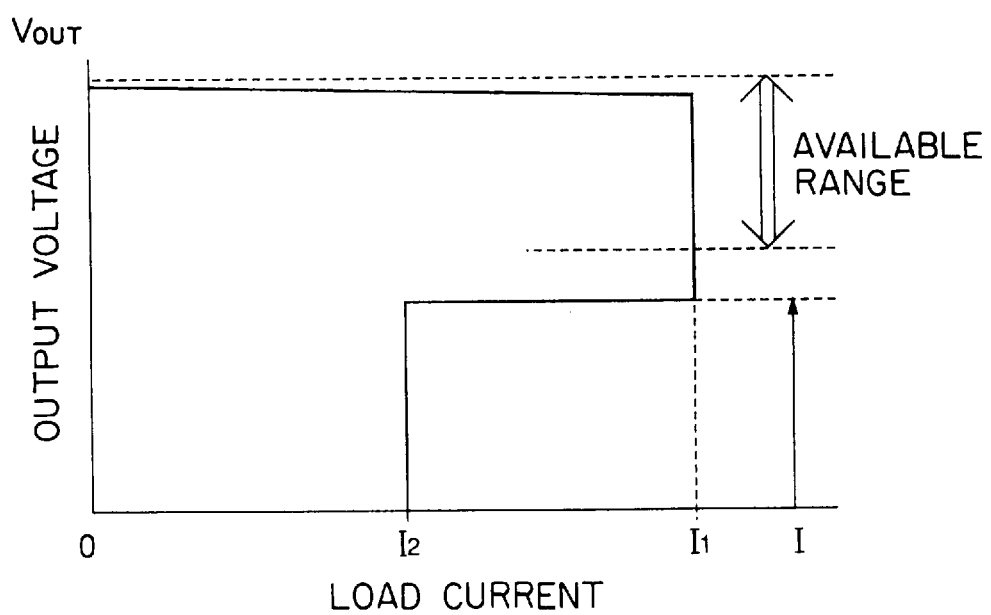
FIG. 2 is a graph showing a relationship between a load current I and an output voltage $V_{OUT}$ ($\Delta V_{F1}$) in the case of a preventing operation.

Next, a description is given of operations of the protecting circuit when the output terminal of the AC adapter is short-circuited. FIG. 2 is a graph showing a relationship between an output voltage $V_{OUT}$ ($\Delta V_{F1}$) and a load current I (charge current) which flows to the load shown in FIG. 1. In the protecting circuit having the above-mentioned structure, a constant current is controlled during charging by a current $I_1$ which is shown by the following expression.

$$I_1 = \left(Vz \times \frac{R_1}{R_1 + R_2}\right) / Rcs \qquad (1)$$

On the other hand, the switch control amplifier is set so that the switching transistor $Tr_3$ is turned off so as to prevent the decrease in voltage of the power source $V_{cc}$ when the power source $V_{cc}$ is 2.4V (4 VF) or less. When the load is increased in this state, a voltage difference between the power source $V_{cc}$ and the output terminal OUT is 0.6V (1 VF) or more. Then, the switching transistor $Tr_1$ is turned on. Accordingly, the switching transistor $Tr_2$ is turned on and the voltage ($V_2$) of the negative terminal of the constant-current control amplifier is given in the following expression (2).

$$V_2 = \left(Vz \div \left(\frac{R_1 \times R_3}{R_1 + R_3} + R_2\right)\right) \times \left(\frac{R_1 \times R_3}{R_1 + R_3}\right) \qquad (2)$$

Therefore, the protecting operation of the protecting circuit in FIG. 1 is controlled by a current $I_2$ which is shown by the following expression (3).

$$I_2 = V_2 / Rcs \qquad (3)$$

FIG. 2 shows the relationship between the load current I and the output voltage $V_{OUT}$ in the protecting operation. A start voltage in the protecting operation is determined by the output voltage $V_{OUT}$ within an available range shown in FIG. 2.

Referring to FIG. 2, in the case of a curve formed by the output voltage $V_{OUT}$ and the load current I in the above operation when the available range is within 2V to 5V and the output voltage is below 2V, the output current is reduced for the protecting operation. Conventionally, even if the available range is below 2V, the load current I is $I_1$ (approximately 500 mA). When the output terminal of the AC adapter is short-circuited, the output voltage is temporarily 0V and the load current $I_2$ (approximately 160 mA) thereafter flows to the load. When the output voltage is over the available range, the load current $I_1$ flows again. When the output voltage is close to an upper limit value within the available range, the load current is gradually reduced. That is, the current can be controlled to have ideal characteristics.

In the present invention, when the output terminal is short-circuited and the output terminal is thereafter is below the available range, the output current can be protected and the current output switch can also be protected. The means for preventing the heating can be made unnecessary by controlling the output current.

What is claimed is:

1. A protecting circuit against short-circuit of an output terminal of an AC adapter, comprising:

a current output switching transistor in which a power source is connected to an emitter thereof and an output terminal is connected to a collector thereof;

a first switching transistor which is turned on when a controlled constant-voltage is over an available range of a voltage difference between a voltage of said power source and an output voltage;

a second switching transistor which is connected to be turned on when said first switching transistor is turned on;

a switch control amplifier for controlling a switching operation so that said current output switching transistor is turned off when a voltage of said power source is a predetermined voltage or less; and a constant-current control amplifier which controls a constant current when said second switching transistor is turned on and enters a protecting operation state.

2. A circuit as claimed in claim 1, further comprising:

first to third resistors which are connected to a negative input terminal of said constant-current control amplifier;

a reference voltage source which is connected to one end of said second resistor;

a constant-current detecting resistor which is connected to a positive input terminal of said constant-current control amplifier;

wherein a charge current serving as a load current is controlled to be constant by a resistor dividing voltage between said current detecting resistor and said reference voltage source during charging; and only when said voltage difference is a reference voltage or more, said control voltage is reduced and the output current is protected.

3. A circuit as claimed in claim 2, wherein said voltage difference is 0.6V.

* * * * *